Oct. 30, 1951      W. T. SEITZ      2,573,283
INDUCTION MOTOR

Filed May 19, 1949      3 Sheets—Sheet 1

INVENTOR.
WALTER T. SEITZ
BY William D. Carothers
HIS ATTORNEY.

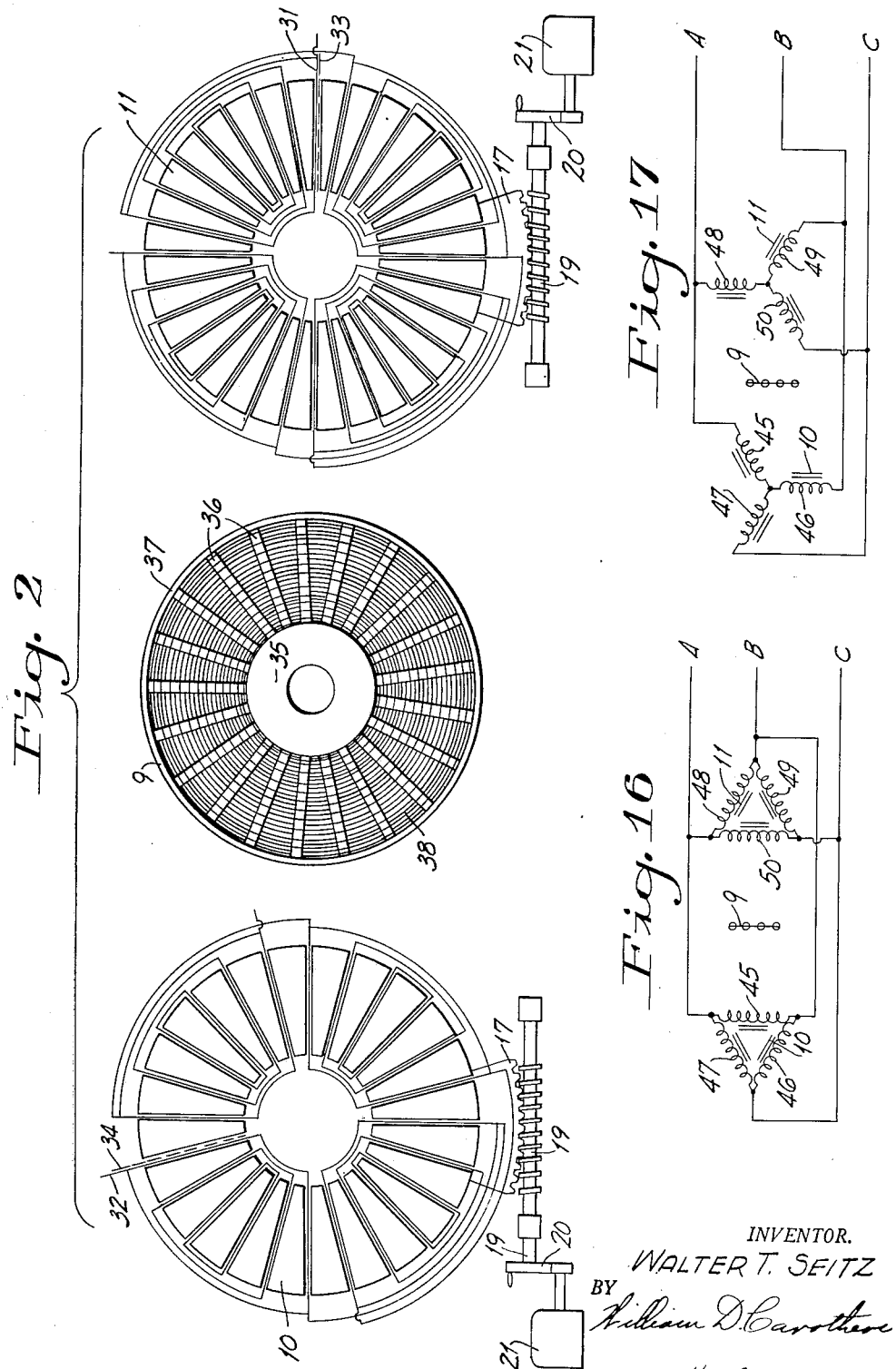

Oct. 30, 1951 — W. T. SEITZ — 2,573,283
INDUCTION MOTOR
Filed May 19, 1949 — 3 Sheets-Sheet 3

INVENTOR.
WALTER T. SEITZ
BY William D. Carothers
HIS ATTORNEY.

Patented Oct. 30, 1951

2,573,283

UNITED STATES PATENT OFFICE 2,573,283

INDUCTION MOTOR

Walter T. Seitz, Etna, Pa.

Application May 19, 1949, Serial No. 94,181

4 Claims. (Cl. 318—243)

This invention relates generally to induction motors, and more particularly to induction motors having a radial armature with dual stators having multiple windings and disposed on opposite sides of the rotor and having relative arcuate movement to each other for varying the speed and the direction of rotation of the armature.

Induction motors having radial armatures and flat stators are disclosed in the art and one is known on the market as an axial air gap motor. The art also teaches the use of a long prepunched iron strip spirally wound to form the core of the rotor or stator of a radial type induction motor. When the core is completely wound, the prepunched openings form continuous radial slots for receiving the windings and bars of the stator and armature, respectively. The rotor slots for receiving bars may be skewed or curved as they progress outwardly. The comparatively large diameter of the rotor relative to that of the ordinary induction motor of the same capacity provides a materially greater flywheel effect and since the rotor is not encircled by the stator, it may operate at a materially lower temperature or function as a greater capacity motor when operated at a temperature ordinarily experienced in a coaxially concentric induction motor.

The object and advantage of the present disclosure is the provision of a radial type induction motor having multiple windings in opposed stators that permit the motor to be connected and operated as a single or multiple phase motor. One or both stators may be mounted for arcuate movement relative to each other for the purpose of reversing the rotation of the motor and at the same time providing infinite variable speeds in operating opposite directions.

By employing a plurality of windings on each of two opposed stators, selected windings of each stator may be coupled to complete a secondary circuit therebetween for the purpose of operating the motor from a single phase alternating current supply with the advantages of reversal in rotation and variable speed by moving one stator arcuate and axially relative to the other.

Single windings in each of the spaced stators on opposite sides of the rotor may be connected through inductive and capacitive reactances to operate the motor on single phase, the direction of rotation and speed of which may be varied by shifting the stators relative to each other. By using multiple windings in each stator, selected windings may be inductively energized and the secondary coils may be connected through a selected reactance to operate on single phase.

Again the windings of opposed stators may be connected to a two phase source of supply and be reversed and operated with speed control by shifting stators relative to each other. Two or three windings may be wound and connected star or delta fashion for three phase with like result.

Other objects and advantages appear in the following description and claims.

The accompanying drawings show, for the purpose of exemplification, without limiting the invention or claims thereto, certain practical embodiments of the invention wherein:

Fig. 2 is a diagrammatic view of the dual stator motor showing both stators open outwardly with a rotor illustrated therebetween;

Fig. 16 is a circuit diagram of a dual stator radial type motor with each stator having three windings formed and connected as a three phase motor with the connections being made in closed delta;

Fig. 17 is similar to Fig. 16 with the connection being made in star; and

Figure 1:
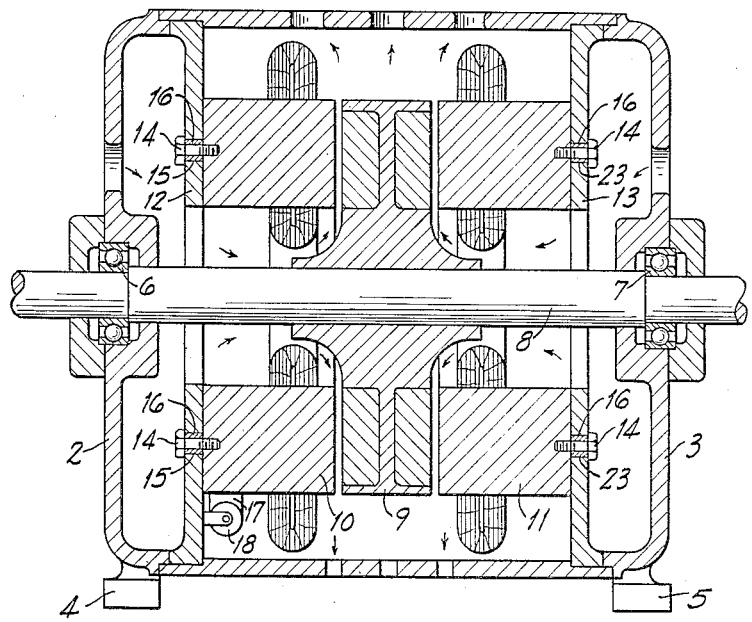
Fig. 1 is a sectional view of the multistator motor comprising this invention.
Figure 3:
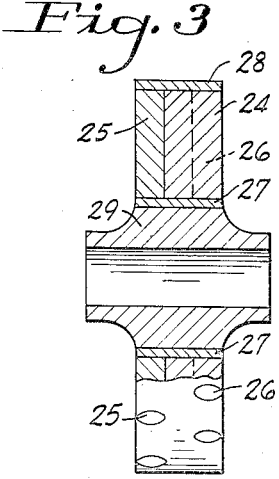
Fig. 3 is a view in section of one type of rotor member.

Referring to Figs. 1 to 3 of the drawings, the dual stator radial induction motor shown is enclosed in the open ended cylindrical casing 1 engaging and secured to the end bells 2 and 3 which may be cast with feet 4 and 5 for supporting the same. Each end bell is arranged to carry frictionless bearings 6 and 7 that are axially aligned to support the shaft 8 and rotatably support the rotor 9, fixed thereto. The shaft extends through the stators 10 and 11 which have central openings and are carried by the spiders 12 and 13 that are in turn clamped between the shoulders on the cylinder 1 and the end bells 2 and 3. The stator 12 is provided with a series of annularly spaced threaded openings for receiving the bolts 14 that extend through arcuate slots 15 in the spider 12 and carry the revolvable sleeves 16. The arcuate slots 15 in the spider permit the stator 10 to be adjusted through an arc greater than 180° electrical phase relation to permit the windings in the stator 12 to be shifted from a full speed in phase position with respect to the windings of the stator 11, through an opposed phase relation that causes the rotor to stop, to an opposite in phase relation causing the rotor to rotate at full speed in the opposite direction. For this purpose a gear segment 17 is attached to the perimeter of the stator 10 and is engaged by the worm gear 18 on the shaft 19 that is carried by bearings on the spider 12 and extends out through the housing and is provided with the hand wheel 20 for adjusting the angular position of the stator 10. Any suitable mechanical or electromechanical means, such as indicated by the motor 21, may be employed to selectively position the stator 10 by a manual control of the motor 21 or by remote control to vary the speed and reverse the direction of rotation of this induction motor.

The stator 11 may be secured to its spider 13 by the bolts 14 extending through the holes 23 of the spider 13 which prevent any relative movement between the stator 11 and the spider 13 although the holes 23 may be made in slots to mount the stator 11 like that of the stator 10 with the positioning motors 21 connected to operate in opposite directions and thus provide a differential control to make a fast reversal or independent dual change in the direction of rotation by simultaneously rotating both stators in opposite directions.

The stators 10 and 11 are preferably made by winding a long prepunched strip of transformer steel on a ring such as indicated at 24, which may be formed by welding the end of the strip to itself after completing the first complete turn. The consecutive punched openings in the single or continuous strip must be spaced at a uniformly increasing distance in order to match one another as the diameter of the stator increases in order that the completed iron core is provided with well formed radial slots to receive the coils. If it is desired to have the slots skew from the radial, the spacing between the punched openings may be varied so that they do not quite mate for each turn of the steel strip, but the prepunched openings should be somewhat larger to accommodate the coils. The last turn making up the laminated stator may be welded on itself. The back face of the stator cores may be lightly welded in a crisscross fashion in order to insure the permanency of this spirally wound transformer steel.

The punched openings in the stator 10 have been made to produce twenty-four radial slots and the punched openings of stator 11 have been made to produce thirty-two slots, which was found to work satisfactory in the same motor wherein the copper spider making up the squirrel cage type rotor had only twenty-one radial bars. The selection of the number of slots and bars may, of course, be determined by calculated design in making up motors of predetermined rating as to power and speed.

The armature or rotor may be made up with prepunched transformer steel shown at 24 in Fig. 3 to form slots on both sides thereof for use with two sets of radial copper bars 25 and 26 connected at their ends with the coaxially concentric copper rings 27 and 28 forming the inner and outer rings of the armature. These two sets of rotor bars may be aligned with one another or offset for the purpose of obtaining selected operating characteristics of the induction motor. However, the continuous strip of steel is spirally wound in the same manner as that of the stators and the slots are slightly skewed. This structure divides the motor in two parts with respect to the circulatory fluid system and the armature functions as an impeller in a centrifugal pump to draw air through the end bells and the open center of stators which is then forced radially past the front face of the stators and out through openings in the casing as shown by the arrows in Fig. 1.

The two stators shown in Fig. 2 have the coil windings indicated thereon and each provides for four poles and the same number of slots. Each pole has two windings or coils that are entirely independent of one another, but may be connected in multiple which would amount to a single coil of larger size wire. If they are connected in series they may be considered as a single coil of more turns. They are also employed independently as primary and secondary windings in some hookups to be described hereinafter. For the purpose of this disclosure 30 and 31 represent the first set of comparable windings on the stators 11 and 10, respectively, and 32 and 33 represent the second set of comparable windings on these stators making four windings in all. Each winding on each stator is shown as applied in four poles of one stator. The slots of each stator being preferably divisible by four permit the coils to be laid therein with the first few complete turns being in adjacent slots, the next few turns in the next adjacent slots and so on as indicated in Fig. 2, the last few turns being the longest since they form the boundary of the pole. The two coils for each pole may be wound in the slots simultaneously or one may be laid on top of the other, whichever is most convenient. Sometimes, only one winding is required on one of the stators in some circuits, but in each instance the size of wire, number of turns and the proper amount of iron and the size of the slots should be, of course, calculated for each design and size of motor. It is also obvious that motors of different sizes should have a different number of poles. In Fig. 2, the leads from coils of adjacent poles are connected to reverse the direction of current flow for both windings. The current flow in the winding of one pole coil should always be in the same direction as the current flow through the coil of the other winding of the same pole.

The rotor 9, shown between the two stators of Fig. 2, is of the squirrel cage type having the nonmagnetic hub 35 secured to the shaft 8 and provided with a series of radial bars 36 extending like spokes of a wheel and preferably inserted in and joined to the coaxially concentric rings forming the hub 35 and the rim 37. These parts are preferably made of copper and are sufficiently strong to withstand the centrifugal force. This rotor has an odd number of spokes or bars, such as twenty-one, and they are wound with iron wire as shown at 38. This continuous iron wire may be wound on the spokes before the rim 37 is placed thereon. The iron wire 38 is started adjacent the hub 35 and woven in and out of adjacent spokes. Since there are only twenty-one bars or spokes, this pancake rotor has the same number of wire turns on one side of each bar as it has on the opposite side. It is of course desirable to place as much iron wire on this rotor as possible, and in the structure shown there is approximately twenty-four turns of iron wire. The other rotor shown in Fig. 3 has materially more iron and is therefore considered preferable. It is also heavier and provides a greater flywheel effect. It may not be desirable to make the rotor too heavy if it is to be reversed quickly and frequently, so too much iron may be undesirable for rapidly reversing motors, but for unidirectional motors the iron strip of the rotor in Fig. 3 may be made wide to intentionally increase the flywheel effect.

The circuit diagrams showing the different ways in which this radial motor can be connected for operation is shown in Figs. 4 to 15, inclusive. The windings indicated on each side of the rotor 9 represent the windings of the opposed stators, one or both of which may be rotated relative to each other for the purpose of placing them in phase to operate the motor at full speed in one direction, to 180° electrical phase relation to operate the motor in the opposite direction at full speed and at the mid point of these positions the motor will stop. Although the windings are fully energized, they oppose one another and lock the rotor from turning. Thus, infinite speed adjustment may be obtained by arcuately moving one or both stators.

Figure 4:
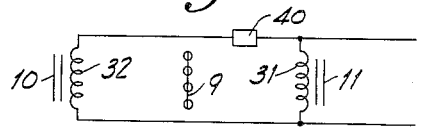
Fig. 4 is a circuit diagram of the dual stator motor comprising this invention connected for single phase and employing a winding in each stator and a reactance.

In the circuit of Fig. 4 one winding 32 is indicated for stator 10 and one winding 31 is indicated for stator 11. Of course these windings may be a heavy single wire winding or two lighter wire windings in multiple or in series as the circuit is merely illustrative diagrammatically for single phase. The winding 32 is connected in series with a reactance or impedance 40 to shift the phase between the two windings and they both receive energy directly from the alternating current source such as single phase 115 v. 60 cycle current. With two coils in multiple in each stator and a capacitive reactance at 40, the speed of the rotor was found to be approximately 1400 R. P. M. If only one coil in each stator is employed with a capacitive reactance 40, the speed was of course proportionately reduced to 900 R. P. M. With two coils in multiple in stator 11 and one coil in stator 10, and a capacitive reactance 40, the speed was further proportionately reduced to 600 R. P. M. and with an inductive reactance at 40, it rotates at only 100 R. P. M. Thus, the ampere turns per winding and the reactance 40 may be selected to provide a single phase rotor of the desired characteristics and the speed can be varied by increments from the maximum to zero and reversed in rotation by shifting one or both stators.

Figure 5:
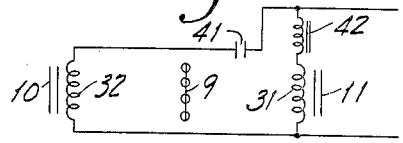
Fig. 5 is a circuit diagram of a single phase dual stator motor having a winding in each stator with a capacitive reactance in series with one winding and an inductive reactance in series with another winding.

In the circuit of Fig. 5, a capacitive reactance 41 is in series with one winding and an inductive reactance 42 is in series with the other winding and both winding circuits are connected in parallel across the alternating current single phase source. The circuits of Figs. 4 and 5 are in effect a split phase induction motor circuits yet the windings are in opposed stators that have relative arcuate movement to vary the speed and reverse the direction of rotation without changing the hookup.

Figure 6:
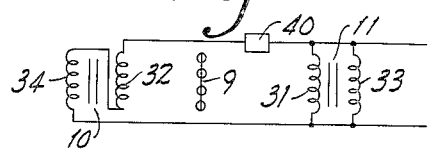
Fig. 6 is a circuit diagram of a single phase dual stator motor employing two windings in series in the first stator and two windings in multiple in the second stator and a reactance connected in series with the first windings.

The circuit of Fig. 6 carries the dual stator motor connections one step further in that the two windings 32 and 34 of stator 10 are connected in series while the windings 31 and 33 of stator 11 are connected in multiple with the reactance 40 in series with the windings 32 and 34. The comparative speed of this circuit is about 600 R. P. M. with a capacitive reactance 40 on 115 v. 60 cycles.

Figure 7:
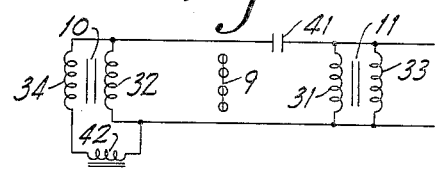
Fig. 7 is a circuit diagram of a single phase motor having an inductive reactance connected in series with one of two windings in the first stator that are connected in multiple and a capacitive reactance connected in series with the multiple connected windings of the second stator.

In the circuit of Fig. 7, the inductive reactance 42 is placed in series with winding 34 and the capacitive inductance 41 is placed in series with both windings of stator 10. This hookup operates the motor at a top comparative speed of about 1200 R. P. M.

In the circuits of Figs. 4 to 7, one or both of the windings in each stator are directly supplied with current from the alternating current source. However, in Figs. 8 to 12, some of the windings are inductively energized.

Figure 8:
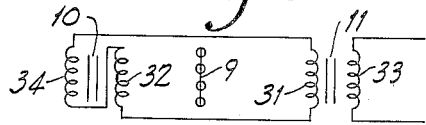
Fig. 8 is a circuit diagram of an inductively coupled single phase motor having two windings of the first stator connected in series and across the secondary winding of the second stator.

As shown in Fig. 8, the alternating current source is supplied to winding 33 of stator 11 which provides a primary winding inductively coupled to the winding 31 of the same stator, which in turn is electrically connected to the windings 32 and 34 in series with one another. This inductive connection eliminates the necessity of any reactance and the top comparative speed of the motor is 300 R. P. M.

Figure 9:
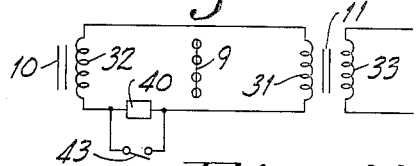
Fig. 9 is a circuit diagram of an inductively coupled single phase motor having one winding of the first stator connected in multiple with a secondary winding in the second stator.

The inductive coupling shown in Fig. 9 is similar to that of Fig. 8, but employs only winding 32 of stator 10 in the secondary circuit, and when the switch 43 is closed to short the reactance 40, the motor operates at about 600 R. P. M. With the reactance in the circuit, the speed is reduced slightly indicating proper phase relation of the inductively coupled windings which do not require further phase shifting. The speed and reversal in direction of rotation may both be changed by moving the stators relative to each other in each of these instances.

Figure 10:
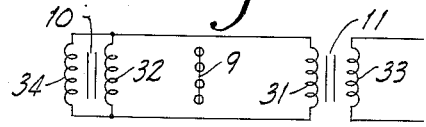
Fig. 10 is a circuit diagram of an inductively coupled single phase motor similar to that shown in Fig. 8 except the windings of the first stator are connected in multiple.

By placing the windings 32 and 34 in multiple as shown in Fig. 10, the speed is increased to 800 R. P. M. Thus, Figs. 8, 9 and 10 indicate that an increased ampere turns in the stator 10 which increases the comparative speed accordingly when such windings are inductively energized.

Figure 11:
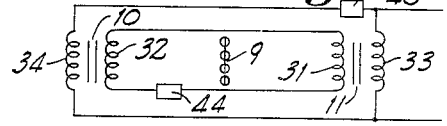
Fig. 11 is a circuit diagram of an inductively coupled single phase motor with a secondary winding of the first stator connected in multiple with a corresponding secondary winding of the second stator and a reactance placed in series with each pair of windings and with the primary windings connected across the line.
Figure 12:
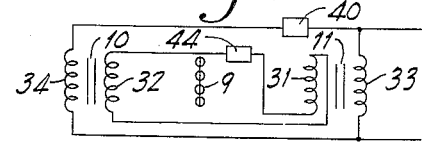
Fig. 12 is a circuit diagram of an inductively coupled single phase motor similar to Fig. 11 with the leads of one induced winding reversed.

In Figs. 11 and 12, the circuits are split phase and inductively coupled. With a capacitive reactance at 40 in the primary circuit and an inductive reactance 44 in the secondary circuit, the hookup of Fig. 11 operates at approximately 1,000 R. P. M. and in Fig. 12 about 400 R. P. M., the difference being brought about in reversing the connection of the secondary winding 31 of stator 11 as shown in Fig. 12. However, the same effect in reduction of speed may be produced in Fig. 11 by making the reactance 40 inductive and the reactance 44 capacitive which results in a comparative speed of approximately 400 R. P. M.

Figure 13:
Fig. 13 is a circuit diagram employing a dual stator radial motor connected as a two phase motor, employing a winding in each of the two stators.
Figure 14:
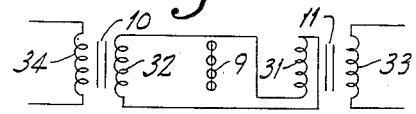
Fig. 14 is a circuit diagram similar to Fig. 13 but also includes a parallel connection between the secondaries of each stator.

This dual stator radial motor is ideal for operation as a two phase motor as illustrated in Fig. 13, wherein the windings of each stator are connected to their separate phases. An inductively coupled hookup for two phase is shown in Fig. 14 wherein it is preferable to reverse the leads of one of the secondary windings which in the case shown is winding 31.

Figure 15:
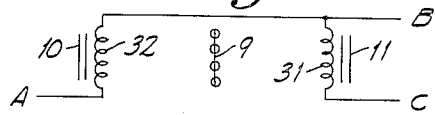
Fig. 15 is a circuit diagram of a three phase motor employing a winding in each stator.

A star connection for three phase is illustrated in Fig. 15 wherein one end of the windings of one stator is connected to one end of the windings of the other stator to provide one phase line and the other ends of said windings for each of the other two lines.

The diagrammatic view of Figs. 16 and 17 require the stators 10 and 11 to be wound with three coils each, 45, 46 and 47 in stator 10 and 48, 49 and 50 in stator 11. These coils are wound in the stators in the manner of any three phase induction motor and in Fig. 16 are connected in delta, while in Fig. 17 they are connected in star with the windings of one stator connected in multiple with the windings of the other stator. By turning one or both stators from an in-phase position to an out-of-phase position, the speed of the induction motor may be regulated to a very fine degree from full speed to stop.

Figure 18:
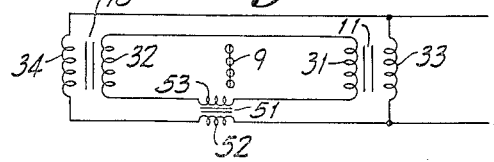
Fig. 18 is a circuit diagram of a dual stator radial motor having selected primary and secondary inductively connected directly and with the primary and secondary circuits inductively connected through a transformer.

In the structure of Fig. 18, the single phase windings are connected as illustrated in Fig. 11 with the reactances 40 and 44 omitted and an inductively coupled transformer reactance 51, with its windings 52 and 53, is employed in its stead. The winding 52 being in series with the windings 33 and 34 of the primary circuit. The winding 53 is in series with the windings 31 and 32 of the secondary circuit. Without this inductive reactance the motor of this circuit is not self-starting.

While, for clarity of explanation, certain preferred embodiments of this invention have been shown and described, it is to be understood that this invention is capable of many modifications, and changes in the construction and arrangement may be made therein and certain parts may be employed without conjoint use of other parts and without departing from the spirit and scope of this invention.

I claim:

1. A rotary induction motor comprising a housing, a rotor mounted for rotation in said housing, two stators mounted in the housing with one positioned on each side of said rotor, one of said stators movable about the axis of said rotor, a primary motor winding in the first stator, a secondary winding in the first stator inductively coupled with said primary motor winding, a winding in said second stator, a reactance, and a circuit connecting said reactance and said secondary winding and the winding in the second stator in a closed circuit.

2. The structure of claim 1 which also includes a reactance in the circuit of the primary winding effective for shifting the primary and secondary currents farther apart than that produced by the reactance in the secondary winding circuit.

3. The structure of claim 1 which also includes a primary motor winding in said second stator inductively coupled with the winding in said second stator.

4. The structure of claim 1 which also includes a reactance in the circuit of the primary winding that is inductively coupled independently with the reactance in the circuit of the secondary winding.

WALTER T. SEITZ.

REFERENCES CITED

The following references are of record in the file of this patent:

UNITED STATES PATENTS

| Number | Name | Date |
|---|---|---|
| 504,914 | Eldredge | Sept. 12, 1893 |
| 514,907 | Bush | Feb. 20, 1894 |
| 727,662 | Meuschel | May 12, 1903 |
| 1,237,681 | Neuland | Aug. 21, 1917 |
| 1,419,749 | Murphy | June 13, 1922 |
| 1,605,796 | Tanzler | Nov. 2, 1926 |
| 1,829,686 | Swendsen | Oct. 27, 1931 |
| 1,893,112 | Swendsen | Jan. 3, 1933 |
| 1,977,950 | Morhard | Oct. 23, 1934 |
| 1,998,142 | Meyertons | Apr. 16, 1935 |
| 2,324,728 | Schiff | July 20, 1943 |
| 2,479,589 | Parker | Aug. 23, 1949 |